United States Patent
Hayashi et al.

(10) Patent No.: US 6,497,743 B2
(45) Date of Patent: *Dec. 24, 2002

(54) FERTILIZER COMPOSITION

(75) Inventors: Masaharu Hayashi, Wakayama (JP);
Tadayuki Suzuki, Wakayama (JP);
Kazuhiko Kurita, Wakayama (JP);
Masatoshi Kamei, Wakayama (JP);
Katsuhiko Yamaguchi, Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/059,412

(22) Filed: Jan. 31, 2002

(65) Prior Publication Data

US 2002/0100302 A1 Aug. 1, 2002

Related U.S. Application Data

(63) Continuation of application No. 09/243,482, filed on Feb. 3, 1999, now Pat. No. 6,387,147.

(30) Foreign Application Priority Data

Feb. 6, 1998 (JP) ............................................. 10-26041
Feb. 6, 1998 (JP) ............................................. 10-26042

(51) Int. Cl.⁷ ............................ C05G 5/00; C05F 11/00
(52) U.S. Cl. .......................................... 71/27; 71/64.1
(58) Field of Search ............................... 71/11, 27, 64.1

(56) References Cited

U.S. PATENT DOCUMENTS

| | | | |
|---|---|---|---|
| 4,125,393 A | 11/1978 | Kohl et al. | |
| 4,507,142 A | * 3/1985 | Pace et al. ...................... | 71/38 |
| 4,581,056 A | * 4/1986 | Nooden et al. ................. | 71/28 |
| 4,581,057 A | * 4/1986 | Nooden et al. ................. | 71/28 |
| 5,482,529 A | 1/1996 | Ahlnas et al. | |
| 5,549,729 A | 8/1996 | Yamashita | |
| 5,618,330 A | 4/1997 | Sylvester | |
| 5,681,366 A | 10/1997 | Herold et al. | |

FOREIGN PATENT DOCUMENTS

| | | |
|---|---|---|
| EP | 0 205 748 | 12/1986 |
| EP | 0 784 040 | 7/1997 |
| JP | 59-137384 | 8/1984 |
| JP | 60-260487 | 12/1985 |
| JP | 4-202080 | 7/1992 |
| JP | 7-10666 | 1/1995 |
| WO | WO 95/21142 | 8/1995 |
| WO | WO 98/06681 | 2/1998 |

* cited by examiner

Primary Examiner—Wayne A. Langel
(74) Attorney, Agent, or Firm—Oblon, Spivak, McClelland, Maier & Neustadt, P.C.

(57) ABSTRACT

The present invention provides a fertilizer composition which enables the efficient absorption of a fertilizer such as calcium. Namely, the present invention provides a fertilizer composition comprising a specific anionic surfactant or a hydrophilic nonionic surfactant and a fertilizer as the essential components.

34 Claims, No Drawings

FERTILIZER COMPOSITION

This application is a Continuation of application Ser. No. 09/243,482 Filed on Feb. 3, 1999, U.S. Pat. No. 6,387,147.

TECHNICAL FIELD

The present invention relates to a fertilizer composition, more specifically to a fertilizer composition to be applied or sprayed to the roots, stems, leaves or fruits of plants for the purpose of preventing the plants from developing physiological lesions due to the deficiency of nutrient elements such as calcium.

BACKGROUND ART

Plants require various nutrient elements for their growth, but such elements are not always present copiously in the soil. It is known that plants therefore suffer obstruction of growth when they are not supplied sufficiently with some of the elements. As respects the three major elements of fertilizer, for example, nitrogen (N) is a constituent (i.e. component) element of proteins, phosphorus (P) not only is a constituent (i.e. component) element of nucleic acids and phospholipids but also fulfills an important role in the energy metabolism and the synthesis and decomposition of substances, and potassium (K) discharges physiological functions of metabolism and mass transfer. Insufficient supply of these main components (i.e. elements) generally renders the growth of plants inferior. Further, calcium is an important component constituting plants themselves and cells thereof and plays the important role of balancing the metabolism system. It is, however, prone to cause symptoms of calcium deficiency and induce physiological lesions, for example, tip rot in tomatoes, core rot in white rapes and cabbages, bitter pit in apples, and tip burn in strawberries.

When the soil is deficient in nitrogen, phosphorus and potassium, it is a general practice to incorporate a chemical fertilizer thereinto. With the purpose of inhibiting the physiological lesions due to the deficiency of calcium, meanwhile, many attempts have been made to incorporate inorganic calcium or the like into the soil to thereby supply calcium to a plant through its roots. More often than not, however, the calcium thus supplied is not thoroughly absorbed into the plant because part of the calcium reacts with atmospheric carbon dioxide and escapes ultimately in the form of calcium carbonate into the underground, because the calcium reacts with other incorporated chemical fertilizer and consequently incurs inactivation, and because such a phenomenon leads to fertilizer application imbalanced between chemical fertilizer and calcium. Even when the calcium is absorbed somehow or other through the root of a plant, it often fails to reach the site at which the physiological lesion actually develops because this element incurs unusual difficulty in migrating inside the system of a plant. When it reaches the site at all, it takes a considerably long time to do so and it therefore fails to exert an immediate effect on the lesion.

In recent years, therefore, attempts have been made to protect plants, which will easily suffer from physiological lesions due to the deficiency of calcium, from such lesions by spraying a calcium fertilizer in the form of an aqueous solution directly on leaves and fruits of the plants.

Known calcium fertilizers to be appliedby the above technique of foliage spray include such water-soluble calcium salts as calcium formate (JP-A 59-137384), calcium acetate (JP-A 60-260487), calcium propionate (JP-A 4-202080), calcium chloride and calcium nitrate and so on. Further, calcium fertilizers obtained by combining highly soluble calcium salts with lowly soluble ones have been also known (JP-A 7-10666). Meanwhile, WO98/06681 publicly opened on Feb. 19, 1998 discloses the addition of heptonic acid or sodium heptonate and a surfactant to fertilizers.

The foliage spray of the aqueous solution of a calcium salt, however, had the problem of poor absorption efficiency because the absorption of calcium through the leaves and the fruits of a plant was generally low. Further, an effort to spray an excess of a fertilizer such as N, P, K or calcium salts for the purpose of enhancing the absorption thereof ironically results in imparting stress to the plant and causing toxic damage to the plant.

DISCLOSURE OF THE INVENTION

The inventors of the present invention have made intensive studies for the purpose of solving the above problems and have found that when a fertilizer composition comprising a combination of a specific anionic surfactant or a hydrophilic nonionic surfactant with a fertilizer, particularly a calcium compound is applied to the roots or leaves of a plant in the form of an aqueous solution or an aqueous dispersion, the plant can efficiently absorb the fertilizer, particularly calcium. The present invention has been accomplished on the basis of this finding.

The present invention provides a fertilizer composition comprising 0.1 to 30% by weight of (A) at least one anionic surfactant selected from the group consisting of carboxylic acid type surfactants, sulfuric ester type surfactants, phosphoric ester type surfactants and naphthalenesulfonic acid type surfactants or at least one hydrophilic nonionic surfactant, 1 to 60% by weight of (B) a fertilizer, and 0.01 to 10% by weight of (C) an organic acid, exclusive of heptonic acid, or a salt thereof. Hereinafter, "an organic acid, exclusive of heptonic acid, or a salt thereof" means not only exclusion of heptonic acid but also exclusion of a salt of heptonic acid.

That is, the present invention relates to a fertilizer composition characterized by containing an anionic surfactant selected from among carboxylic acid type surfactants, sulfuric ester type surfactants, phosphoric ester type surfactants and naphthalenesulfonic acid type surfactants or a hydrophilic nonionic surfactant and a fertilizer as the essential components. In particular, it provides a fertilizer composition which permits high-efficiency absorption of the fertilizer into a plant when sprayed on the leaves of the plant in the form of an aqueous solution or an aqueous suspension. Herein, the fertilizer is also a fertilizer-effective component.

Further, the present invention also provides a method for improving the absorption efficiency of the fertilizer (B) for a plant by applying the above fertilizer composition to the roots, stems, leaves or fruits of the plant.

Additionally, the present invention provides a method for supplying the fertilizer (B) to a plant by applying the above fertilizer composition to the roots, stems, leaves or fruits of the plant.

The anionic surfactant to be used in the present invention is one selected from among carboxylic acid type surfactants, sulfuric ester type surfactants, phosphoric ester type surfactants and naphthalenesulfonic acid type surfactants.

Examples of the carboxylic acid type surfactants include fatty acids each having 8 to 20 carbon atoms and salts thereof, polyhydric carboxylic acids and salts thereof, polyoxyalkylene alkyl ether carboxylic acids and salts thereof, polyoxyalkylene alkylamide ether carboxylic acids and salts thereof, rhodinic acid and salts thereof, dimer acids and salts thereof, polymer acids and salts thereof, and tall oil fatty acids and salts thereof. Further, examples of the amino acid type surfactants include acylamino acid salts, salts of acylsarcosine, acyloylmethylaminopropionic acid salts, alkylamino-propionic acid salts, and acylamidoethylhydroxyethyl-methylcarboxylic acid salts; and examples of the imidazoline type surfactants include alkylcarboxy-methylhydroxyethylimidazolinium betaines and alkyl-ethoxycarboxymethylimidazolinium betaines.

Examples of the sulfuric ester type surfactants include alkyl sulfates and salts thereof, polyoxyalkylene alkyl sulfates and salts thereof, polyoxyalkylene alkylphenyl ether sulfates and salts thereof, tristyrenated phenol sulfates and salts thereof, and polyoxyalkylene distyrenated phenol sulfates and salts thereof.

Examples of the phosphoric ester type surfactants include alkyl phosphates and salts thereof, alkylphenyl phosphates and salts thereof, polyoxyalkylene alkyl phosphates and salts thereof, and polyoxyalkylene alkylphenyl phosphates and salts thereof.

Examples of the naphthalenesulfonic acid type surfactants include alkylnaphthalenesulfonic acids, β-naphthalenesulfonic acid-formalin condensates, and alkylnaphthalenesulfonic acid-formalin condensates and salts thereof.

The alkyl or alkenyl chains of these compounds each generally have 8 to 20 carbon atoms, and the salts thereof include alkali metal salts (such as Na salts and K salts), ammonium salts, alkanolamine salts, aliphatic amine salts and so on. Further, the above anionic surfactants may be used each alone or as a mixture of two or more of them.

When any of the above surfactants contains a polyoxyalkylene group, this group is preferred to be a polyoxyethylene group and the number of molecules added is preferred to be in the range of 1 to 50.

The hydrophilic nonionic surfactant to be used in the present invention is one having an HLB value of 5 or above, preferably 8 or above, still preferably 10 or above, as calculated by the Griffin equation. Specific examples thereof include sorbitan fatty acid esters, polyoxyalkylene sorbitan fatty acid esters, polyoxyalkylene fatty acid esters, polyoxyalkylene glycerin fatty acid esters, polyglycerin fatty acid esters, polyoxyalkylene polyglycerin fatty acid esters, sucrose fatty acid esters, polyoxyalkylene sucrose fatty acid esters, resin acid esters, polyoxyalkylene resin acid esters, polyoxyalkylene alkyl ethers, polyoxyalkylene alkylphenyl ethers, alkyl (poly)-glucosides and polyoxyalkylene alkyl (poly)glucosides. These nonionic surfactants may be used each alone or as a mixture of two or more of them. In general, the nonionic surfactants each contain as the hydrophobic group a hydrocarbon group having 12 to 18 carbon atoms. With respect to nonionic surfactants having polyoxyalkylene groups, the polyoxyalkylene groups are preferably polyoxyethylene groups wherein the number of molecules added is 1 to 50, still preferably 8 to 40.

Further, anionic and nonionic surfactants other than as the essential components in the present invention, and cationic and amphoteric surfactants may be used in the present invention in combination with the essential components.

The fertilizer composition of the present invention contains a fertilizer in addition to the above specific anionic surfactant or hydrophilic nonionic surfactant. Examples of the fertilizer include inorganic and organic substances containing N, P, K, Ca, Mg, S, B, Fe, Mn, Cu, Zn, Mo, Cl, Si, Na and other elements, among which calcium compounds are particularly preferable. Examples of the calcium compounds include inorganic calcium salts such as calcium chloride, calcium nitrate, calcium carbonate, calcium sulfate, quick lime and slaked lime; salts of calcium with organic acids such as acetic acid, formic acid and lactic acid; and salts of calcium with polyaminocarboxylic acid type chelating agents such as ethylenediaminetetraacetic acid, and fatty acids, which may be used also as a mixture of two or more of them. In particular, it is preferable to use a water-soluble calcium salt such as calcium chloride, calcium nitrate, calcium formate and calcium gluconate.

The fertilizer composition of the present invention generally comprises the anionic surfactant or the hydrophilic nonionic surfactant in an amount of 0.1 to 30% by weight and a fertilizer, particularly a calcium fertilizer in an amount of 1 to 60% by weight (in terms of calcium salt), and may further contain other optional components and water or a solvent for the balance, though the formulation thereof may be varied at need.

The fertilizer composition of the present invention can be further improved in absorption efficiency by adding thereto an organic acid having a chelating ability or a salt thereof. In particular, it is preferable that the organic acid be a hydroxycarboxylic acid such as citric acid, gluconic acid, malic acid and heptonic acid, an aminocarboxylic acid, still preferably one having a plurality of carboxyl groups and amino groups, e.g., polyaminocarboxylic acid such as ethylenediamine-tetraacetic acid, ascorbic acid, or a polybasic acid such as oxalic acid. Examples of the salt include potassium salts, sodium salts, alkanolamine salts and aliphatic amine salts. Such an organic acid (or salt) may be contained in the composition in an amount of 0.01 to 10% by weight, preferably 0.1 to 5% by weight.

Although the fertilizer composition of the present invention may take any form selected from among solutions, flowable powders, wettable powders (as hydrates), granules (as particles), dusts (fine powders) and so on, aqueous liquid forms are particularly preferable from the standpoint of easiness of preparation of a dilution. In general, the composition is diluted to a conventional fertilizer concentration, particularly a calcium concentration of 1 ppm to 1%, preferably 50 ppm to 0.5% and then applied to the leaves or roots of a plant in the form of an aqueous solution, an aqueous dispersion or an emulsion.

Various means can be used for the supply of the fertilizer composition of the present invention to a plant. Examples of the means include direct spray of a diluted aqueous solution of the composition on the leaves, stems or fruits of a plant, injection of the aqueous solution into the soil, and addition of a dilution of the composition to the culture solution or feed water used in water culture or rock wool in contact with the roots of a plant.

The fertilizer composition of the present invention can be used as sprayed on various field crops and (domestic) garden plants because it causes no toxic damage to plants and enables plants to absorb calcium and other fertilizers efficiently.

EMBODIMENTS FOR CARRYING OUT THE INVENTION

The present invention will now be described by referring to Examples, though the present invention is not limited by them. Products 1 to 3 of the invention contain anionic surfactants according to the present invention, while Products 4 to 9 of the invention contain nonionic surfactants according to the present invention.

EXAMPLE 1

A preparative example of Product 1 of the invention will be described. Products 2 and 3 of the invention were also prepared according to the same procedure as that of the above example. $CaCl_2 \cdot 2H_2O$ as a calcium source and sodium gluconate were dissolved in a proper amount of tap water in concentrations of 25% by weight and 0.5% by weight respectively based on the final preparation to be formed. The obtained aqueous solution was adjusted to pH 7.0 with 0.1N hydrochloric acid. Potassium oleate (a product of Kao Corporation, "FR-14") as an anionic surfactant was dissolved in the resulting solution in a concentration of 2% by weight based on the final preparation to be formed, and then tap water was added thereto to make up to a total amount of 100%. The preparation thus obtained was a slightly yellow transparent aqueous solution. For comparison, there were also formulated preparations (as Comparative products 10 to 12) comprising only $CaCl_2 \cdot 2H_2O$, $Ca(NO_3)_2$ or calcium formate respectively, a preparation (as Comparative product 13) comprising $CaCl_2 \cdot 2H_2O$ and sodium heptonate, a preparation (as Comparative product 14) comprising $CaCl_2 \cdot 2H_2O$ and sodium citrate, a preparation (as Comparative product 15) comprising $Ca(NO_3)_2$ and sodium citrate, and a preparation (as Comparative product 16) comprising $Ca(NO_3)_2$ sodium dodecylbenzenesulfonate and sodium gluconate. The calcium preparations thus obtained were subjected to the tests which will be described. The formulae of these calcium preparations are shown in Table 1.

EXAMPLE 2

A preparative example of Product 4 of the invention will be described. Products 5 to 9 of the invention were also prepared according to the same procedure as that of the above example. $CaCl_2 \cdot 2H_2O$ as a calcium source and sodium gluconate were dissolved in a proper amount of tap water in concentrations of 40% by weight and 2% by weight respectively based on the final preparation to be formed. The obtained aqueous solution was adjusted to pH 7.0 with 0.1N hydrochloric acid. Alkyl (lauryl) glucoside (a product of Kao Corporation: Mydol 10) as a nonionic surfactant was dissolved in the resulting solution in a concentration of 10% by weight based on the final preparation to be formed, and then tap water was added thereto to make up to a total amount of 100%. The preparation thus obtained was a slightly yellow transparent aqueous solution. For comparison, a preparation (as Comparative product 17) comprising $CaCl_2 \cdot 2H_2O$ and glycerol monostearate was prepared. The calcium preparations thus obtained were subjected to the tests which will be described. The formulae of these calcium preparations are shown in Table 1.

TABLE 1

| Preparation No. | Raw materials used in composition | Proportions of mixture (%) |
|---|---|---|
| | Product of the invention | |
| 1 | $CaCl_2 \cdot 2H_2O$ | 25 |
| | Potassium oleate | 2 |
| | Sodium gluconate | 0.5 |
| 2 | $CaCl_2 \cdot 2H_2O$ | 25 |
| | Sodium dioctylsulfosuccinate | 2 |
| | Sodium citrate | 0.5 |
| 3 | $Ca(NO_3)_2 \cdot 2H_2O$ | 30 |
| | Sodium salt of POE (10) lauryl ether acetic acid | 5 |
| | EDTA $\cdot$ 3Na | 0.5 |
| 4 | $CaCl_2 \cdot 2H_2O$ | 40 |
| | Lauryl glucoside | 10 |
| | Sodium gluconate | 2 |

TABLE 1-continued

| Preparation No. | Raw materials used in composition | Proportions of mixture (%) |
|---|---|---|
| 5 | $CaCl_2 \cdot 2H_2O$ | 40 |
| | POE (20) sorbitan oleate | 10 |
| | Sodium citrate | 5 |
| 6 | $Ca(NO_3)_2 \cdot 2H_2O$ | 40 |
| | Polyglycerin oleic acid ester | 20 |
| | Sodium citrate | 5 |
| 7 | $CaCl_2 \cdot 2H_2O$ | 40 |
| | Fatty acid ester of sucrose (C16/C18) | 5 |
| | Sodium gluconate | 1 |
| 8 | Calcium formate | 10 |
| | POE (20) sorbitan laurate | 4 |
| | Glycerin monooleate | 1 |
| | Sodium gluconate | 0.5 |
| 9 | $Ca(NO_3)_2 \cdot 2H_2O$ | 40 |
| | POE (10) oleate | 10 |
| | EDTA–3Na | 1 |
| | Comparative product | |
| 10 | $CaCl_2 \cdot 2H_2O$ | 40 |
| 11 | $Ca(NO_3)_2 \cdot 2H_2O$ | 40 |
| 12 | Calcium formate | 15 |
| 13 | $CaCl_2 \cdot 2H_2O$ | 40 |
| | Sodium heptonate | 5 |
| 14 | $CaCl_2 \cdot 2H_2O$ | 45 |
| | Sodium citrate | 5 |
| 15 | $Ca(NO_3)_2 \cdot 2H_2O$ | 40 |
| | Sodium citrate | 5 |
| 16 | $Ca(NO_3)_2 \cdot 2H_2O$ | 20 |
| | Sodium dodecylbenzenesulfonate | 2 |
| | Sodium gluconate | 0.5 |
| 17 | $CaCl_2 \cdot 2H_2O$ | 40 |
| | Glycerin monostearate | 5 |

The rest of the mixture is water.

(note) The abbreviation "POE" in the table stands for polyoxyethylene and the parenthesized numerals represent the average numbers of ethylene oxide molecules added.

Test Example 1
<Trial Supply of Calcium to *Brassica Campestris*>

Seeds of *Brassica campestris* (a product of Takii Shubyo K.K.) were planted in a 50-well cell. After the second leaves had begun to develop, a dilution of each calcium preparation was applied to the soil in each experimental plot comprising ten wells twice a week. This dilution was one prepared by diluting the calcium preparation to 0.5% in terms of CaO. The dilution was applied in an amount of about 100 ml per plant growing in ten wells, which was enough to wet the soil sufficiently (with excess dilution running out through bottom holes). This test was continued for four weeks. After the completion of the test, the above-ground parts of the plants of each plot were collected, thoroughly washed, freed from the water, and weighed. Then, the *Brassica campestris* (ten plants) of each plot were treated in a juicer to collect a leaf juice. This leaf juice was diluted tenfold and mixed with 6 N hydrochloric acid in equal amounts. The obtained mixture (of 3 N hydrochloric acid) was heat-treated to conduct extraction. The resulting mixture was filtered, and the filtrate was diluted 50-fold and examined for calcium content by ICP. The calcium concentrations in the leaves are given in Table 2.

Further, the plants were examined also for toxic damage with the naked eye according to the following criteria (this analytical method was employed also in Test Example 2).

−: no change
±: brown spots accounted for less than 5% of the leaf area,
+: brown spots accounted for 5% to less than 20% of the leaf area, ++: brown spots accounted for 20% to less than 50% of the leaf area, +++: brown sports accounted for 50% or above of the leaf area.

It can be understood from the above results that the products of the invention obtained by combining the anionic surfactants or hydrophilic nonionic surfactants with calcium components permit further accelerated incorporation of Ca into *Brassica campestris* as compared with that of the comparative

TABLE 2

| Preparation No. | Concentration. of Ca in leaves (ppm) | Toxic Damage |
|---|---|---|
| Product of the invention | | |
| Aqueous dispersion system | 1735 | – |
| 1 | 3470 | – |
| 2 | 3820 | – |
| 3 | 3468 | – |
| 4 | 3530 | – |
| 5 | 3750 | – |
| 6 | 3485 | – |
| 7 | 3850 | – |
| 8 | 3653 | – |
| 9 | 3384 | – |
| Comparative product | | |
| 10 | 2564 | – |
| 11 | 2388 | – |
| 12 | 2450 | – |
| 13 | 2483 | – |
| 14 | 2260 | – |
| 15 | 2255 | – |
| 16 | 2986 | ++ |
| 17 | 2605 | – |

Test Example 2

<Trial Foliage Spray of Calcium on Melon>

Seedlings of melon "Earl's" were fix-planted. After the lapse of ten days from the fix planting, a dilution of each Ca preparation having a concentration of 0.1% in terms of CaO was sprayed twice a week eight times in total in an amount of 700 ml per seedling. After the lapse of ten days from the final spraying, the seedlings were collected and analyzed (the period of spraying corresponded to the period ranging from vine elongation stage to flowering and thickening stage). The analysis was conducted in each experimental plot comprising three seedlings. The samples for analysis were prepared according to the method employed in Example 1.

As shown in Table 3, it can be understood that the products of the invention obtained by combining the anionic surfactants or hydrophilic nonionic surfactants with calcium components permit further accelerated incorporation of Ca into melon as compared with that of the comparative products.

TABLE 3

| Preparation No. | CaO of absorption melon (g/seedling) | Toxic Damage |
|---|---|---|
| Product of the invention | | |
| Aqueous dispersion | 3.02 | – |

TABLE 3-continued

| Preparation No. | CaO of absorption melon (g/seedling) | Toxic Damage |
|---|---|---|
| system | | |
| 1 | 6.34 | – |
| 2 | 6.64 | – |
| 3 | 6.24 | – |
| 4 | 6.11 | – |
| 5 | 6.86 | – |
| 6 | 6.45 | – |
| 7 | 6.84 | – |
| 8 | 6.79 | – |
| 9 | 6.67 | – |
| Comparative product | | |
| 10 | 4.66 | – |
| 11 | 5.09 | – |
| 12 | 4.33 | – |
| 13 | 4.26 | – |
| 14 | 4.23 | – |
| 15 | 4.11 | – |
| 16 | 5.68 | + |
| 17 | 3.98 | – |

What is claimed is:

1. A method of fertilizing a plant with a calcium containing fertilizer, comprising:
    applying a fertilizer composition comprising:
        0.1 to 30% by weight of (A) at least one anionic surfactant selected from the group consisting of carboxylic acid surfactants, sulfuric ester surfactants, phosphoric ester surfactants and naphthalenesulfonic acid surfactants or at least one hydrophilic nonionic surfactant;
        1 to 60% by weight of (B) a calcium containing fertilizer, wherein the calcium concentration in the composition in the form of an aqueous solution, an aqueous dispersion or an emulsion is 1 ppm to 1% by weight; and
        0.01 to 10 wt. % of (C) an organic acid, exclusive of heptonic acid, or a salt thereof, to a plant, thereby effectively fertilizing the plant with the calcium containing fertilizer and enhancing the absorption of calcium by the plant.

2. The method according to claim 1, wherein the calcium containing fertilizer contains an organic or inorganic calcium compound as the source of calcium.

3. The method according to claim 1, wherein the organic or inorganic calcium compound is water-soluble.

4. The method according to claim 1, wherein the calcium concentration in the composition ranges from 50 ppm to 0.5% by weight.

5. The method according to claim 4, wherein the calcium containing fertilizer (B) contains a calcium compound selected from the group consisting of calcium chloride, calcium nitrate, calcium carbonate, quick lime, slaked lime, calcium acetate, calcium formate, calcium lactate, a salt of calcium with a polyaminocarboxylic acid chelating agent or a calcium-fatty acid salt.

6. The method according to claim 1, wherein the organic acid is a hydroxycarboxylic acid or an aminocarboxylic acid.

7. The method according to claim 6, wherein the organic acid is selected from the group consisting of citric acid, gluconic acid, malic acid, ethylene-diaminetetraacetic acid, ascorbic acid and oxalic acid.

8. The method according to claim 1, wherein the organic acid salt is a potassium, sodium, an alkanolamine or an aliphatic amine salt of the acid.

9. The method according to claim 1, wherein the fertilizer composition is applied to the leaves of plants.

10. The method according to claim 1, wherein the carboxylic acid surfactant is $C_{8-20}$ fatty acids or salts thereof, polyhydric carboxylic acids and salts thereof, polyoxyalkylene alkyl ether carboxylic acids or salts thereof, polyoxyalkylene alkylamide carboxylic acids or salts thereof, dimer acids or salts thereof, rhodinic acid or salts thereof, polymer acids or salts thereof or tall oil fatty acids or salts thereof.

11. The method according to claim 1, wherein the sulftic ester surfactant is an alkyl sulfate or salt thereof, a polyoxyalkylene alkylphenyl ether sulfate or salts thereof, tristyrenated phenol sulfate or salts thereof or a polyoxyalkylene distyrenated phenol sulfate.

12. The method according to claim 1, wherein the phosphoric ester surfactant is an alkyl phosphate or salts thereof, an alkylphenyl phosphate or salts thereof, a polyoxyalkylene alkyl phosphate or salts thereof or a polyoxyalkylene alkylphenyl phosphate or salts thereof.

13. The method according to claim 1, wherein the naphthalenesulfonic acid surfactant is alkylnaphthalenesulfonic acid, β-naphthalenesulfonic acid-formalin condensates or alkylnaphthalenesulfonic acid-formalin condensates or salts thereof.

14. The method according to claim 1, wherein the hydrophilic nonionic surfactant has an HLB value of at least 5.

15. The method according to claim 1, wherein the fertilizer is applied to the stems, leaves and fruit of the plant.

16. The method according to claim 1, wherein the fertilizer composition further comprises an N, P, K or Mg fertilizer.

17. The method according to claim 1, wherein the fertilizer composition further comprises a carrier with the balance of the composition water or a solvent.

18. A method of improving the absorption efficiency of a calcium containing fertilizer by a plant, comprising:

applying a fertilizer composition comprising:
0.1 to 30% by weight of (A) at least one anionic surfactant selected from the group consisting of carboxylic acid surfactants, sulfuric ester surfactants, phosphoric ester surfactants and naphthalenesulfonic acid surfactants or at least one hydrophilic nonionic surfactant;
1 to 60% by weight of (B) a calcium containing fertilizer, wherein the calcium concentration in the composition in the form of an aqueous solution, an aqueous dispersion or an emulsion is 1 ppm to 1% by weight; and
0.01 to 10 wt. % of (C) an organic acid, exclusive of heptonic acid, or a salt thereof, to a plant, thereby effectively improving the absorption efficiency of the calcium component of the fertilizer as the fertilizer is absorbed by the plant.

19. The method according to claim 18, wherein the calcium containing fertilizer contains an organic or inorganic calcium compound as the source of calcium.

20. The method according to claim 18, wherein the organic or inorganic calcium compound is water-soluble.

21. The method according to claim 18, wherein the calcium concentration in the composition ranges from 50 ppm to 0.5% by weight.

22. The method according to claim 19, wherein the calcium containing fertilizer (B) contains a calcium compound selected from the group consisting of calcium chloride, calcium nitrate, calcium carbonate, quick lime, slaked lime, calcium acetate, calcium formate, calcium lactate, a salt of calcium with a polyaminocarboxylic acid chelating agent and a calcium-fatty acid salt.

23. The method according to claim 18, wherein the organic acid is a hydroxycarboxylic acid or an aminocarboxylic acid.

24. The method according to claim 23, wherein the organic acid is selected from the group consisting of citric acid, gluconic acid, malic acid, ethylene-diaminetetraacetic acid, ascorbic acid and oxalic acid.

25. The method according to claim 18, wherein the organic acid salt is a potassium, sodium, an alkanolamine or an aliphatic amine salt of the acid.

26. The method according to claim 18, wherein the fertilizer composition is applied to the leaves of plants.

27. The method according to claim 14, wherein the carboxylic acid surfactant is $C_{8-20}$ fatty acids or salts thereof, polyhydric carboxylic acids or salts thereof, polyoxyalkylene alkyl ether carboxylic acids or salts thereof, polyoxyalkylene alkylamide carboxylic acids or salts thereof, dimer acids or salts thereof, rhodinic acid or salts thereof, polymer acids or salts thereof or tall oil fatty acids or salts thereof.

28. The method according to claim 14, wherein the sulfuric ester surfactant is an alkyl sulfate or salt thereof, a polyoxyalkylene alkylphenyl ether sulfate or salts thereof, a tristyrenated phenol sulfate or salts thereof or a polyoxyalkylene distyrenated phenol sulfate.

29. The method according to claim 14, wherein the phosphoric ester surfactant is an alkyl phosphate or salts thereof, an alkylphenyl phosphate or salts thereof, a polyoxyalkylene alkyl sulfate or salts thereof or a polyoxyalkylene alkylphenyl phosphates or salts thereof.

30. The method according to claim 14, wherein the naphthalenesulfonic acid surfactant is alkylnaphthalenesulfonic acid, β-naphthalenesulfonic acid-formalin condensates or alkylnaphthalenesulfonic acid-formalin condensates or salts thereof.

31. The method according to claim 14, wherein the hydrophilic nonionic surfactant has an HLB value of at least 5.

32. The method according to claim 18, wherein the fertilizer is applied to the stems, leaves and fruit of the plant.

33. The method according to claim 18, wherein the fertilizer composition further comprises an N, P, K or Mg fertilizer.

34. The method according to claim 18, wherein the fertilizer composition further comprises a carrier with the balance of the composition water or a solvent.

* * * * *